United States Patent [19]
Baker

[11] Patent Number: 6,084,194
[45] Date of Patent: Jul. 4, 2000

[54] METHOD AND APPARATUS FOR ELECTRIC-DISCHARGE TEXTURING ENDS OF A ROLL

[75] Inventor: James W. Baker, St. Clair Shores, Mich.

[73] Assignee: Modern Hard Chrome Service Co., Warren, Mich.

[21] Appl. No.: 09/260,748

[22] Filed: Mar. 1, 1999

[51] Int. Cl.[7] .............................. B23H 5/02; B23H 1/08; B23H 1/02; H05F 3/00
[52] U.S. Cl. .................................... 219/69.17; 219/69.14; 219/69.18; 204/164
[58] Field of Search .................................... 204/164, 165; 422/186; 219/69.18, 69.14, 69.17

[56] References Cited

U.S. PATENT DOCUMENTS

| | | |
|---|---|---|
| 3,800,117 | 3/1974 | Anderson . |
| 3,832,510 | 8/1974 | Pfau et al. . |
| 3,956,609 | 5/1976 | Marendaz . |
| 4,471,199 | 9/1984 | Michishita et al. . |
| 4,870,243 | 9/1989 | Wilson et al. ......................... 219/69.14 |
| 4,950,860 | 8/1990 | El-Menshawy ...................... 219/69.18 |
| 5,034,589 | 7/1991 | Evans et al. . |
| 5,089,681 | 2/1992 | El-Menshawy . |
| 5,280,153 | 1/1994 | Buhler . |
| 5,336,864 | 8/1994 | Martin . |
| 5,408,064 | 4/1995 | Takahara . |
| 5,598,075 | 1/1997 | Liang et al. . |
| 5,753,882 | 5/1998 | Goto et al. . |

Primary Examiner—Kathryn Gorgos
Assistant Examiner—Thao Tran
Attorney, Agent, or Firm—Brooks & Kushman P.C.

[57] ABSTRACT

A method and apparatus for electric-discharge texturing (EDT) ends of a roll rotatably supported about a roll axis uses electrodes mounted on a head. The head is movable in a direction parallel to the roll axis. The electrodes are movable in a direction transverse to the roll axis to maintain a desired spacing with respect to the surface of the roll. Each of the electrodes is positioned at a sparking position along the direction transverse to the roll axis to effect sparking with the surface of the roll. The head is moved in a direction from the center portion of the roll towards the first end of the roll along the direction parallel to the roll axis such that each of the electrodes traverse across the surface of the first end of the roll. Each of the electrodes is then positioned at a retracted position along the direction transverse to the roll axis as each of the electrodes passes off the first end of the roll. The head is then moved back in a direction from the first end towards the second end after all of the electrodes have traversed across the surface of the first end of the roll such that each of the electrodes traverse across the surfaces of the first end and the center portion of the roll. The process is then repeated at the second end. Because each of the electrodes traverse across the surface of the roll, the roll profile deformation across the roll is consistent.

4 Claims, 5 Drawing Sheets

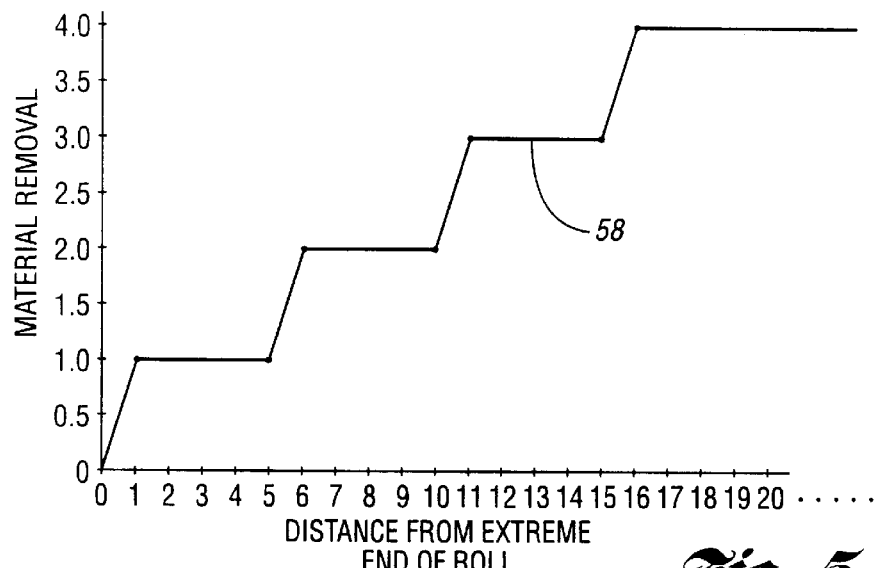
Fig. 5
*(PRIOR ART)*
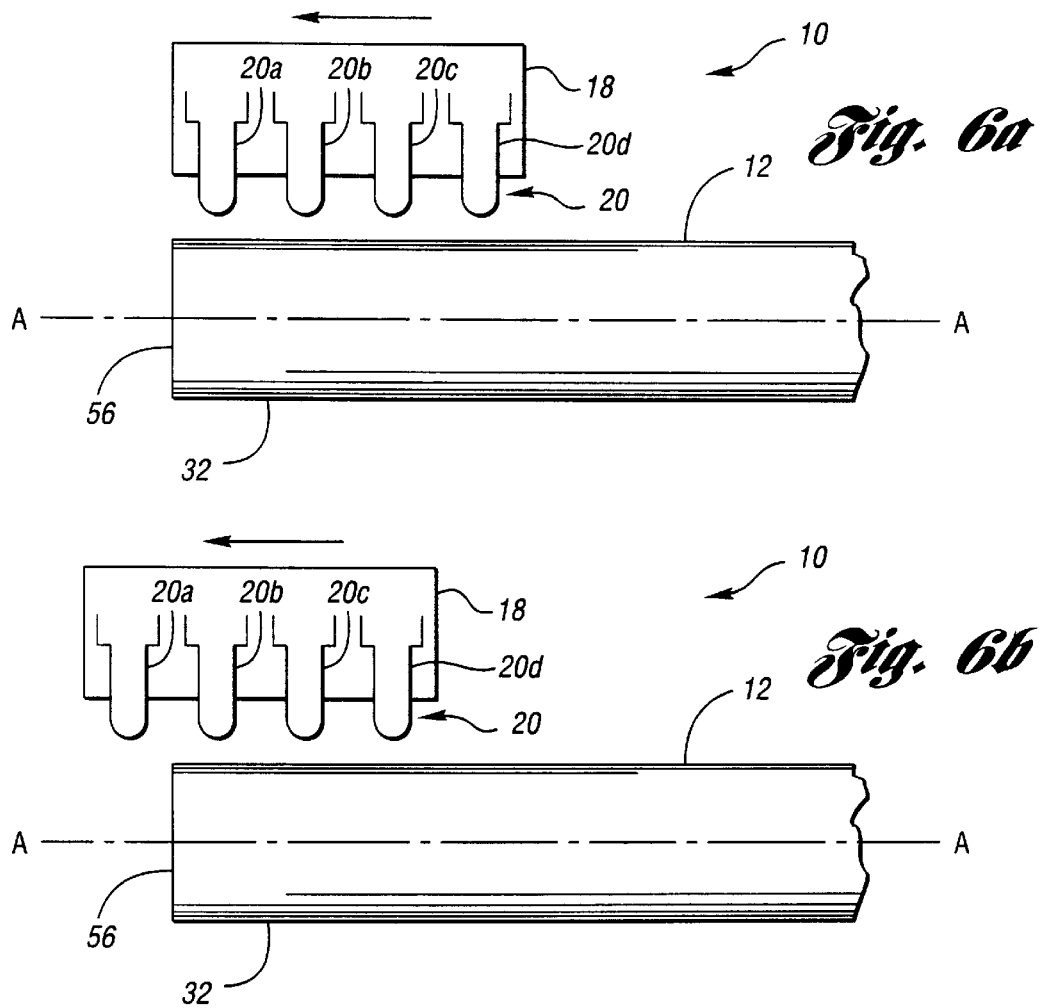
Fig. 6a
Fig. 6b

METHOD AND APPARATUS FOR ELECTRIC-DISCHARGE TEXTURING ENDS OF A ROLL

TECHNICAL FIELD

The present invention relates to a method and apparatus for electric-discharge texturing ends of a roll.

BACKGROUND ART

Electric-discharge machining which is conventionally referred to as EDM has been performed by generating a voltage between an electrode and a workpiece through a dielectric fluid such that a spark momentarily generated removes a portion of the workpiece surface to perform machining. EDM has more recently evolved into electric-discharge texturing (EDT) wherein the surface of a workpiece is textured. For example, rolls used in steel mills to roll steel that is to be painted cannot be too smooth or the paint adhesion will be improper. Texturing of the rolls provides the rolled steel with a textured surface to which paint adheres better. This texturing is performed by an EDT apparatus wherein a head having a bank of electrodes traverses the roll surface as the roll rotates. Actuators move the electrodes towards and away from the roll so as to achieve the correct gap between the electrodes and the roll. The actuators ensure that the electrodes are properly spaced with respect to the roll surface so as to be close enough to generate momentary sparks through dielectric fluid but not too close so as to generate a continuous current flow without any sparks to perform the texturing operation.

A problem with a typical EDT apparatus is that the roll profile deformation at the ends of a roll is different than the roll profile deformation for the central portion of the roll. Specifically, the electrodes in a typical EDT apparatus are spaced apart in the head along a line parallel with the axis of the roll. The head has a given width and traverses across the roll surface from one roll end to the other roll end as the roll rotates. The head reverses direction at each roll end to move the electrodes back toward the other roll end as soon as one of the electrodes lines up with a roll end.

All of the electrodes in the line of electrodes completely pass over the roll surface of the central portion of the roll that is inward from the roll ends by at least the width of the head. However, only some of the electrodes in the line of electrodes pass over the end portions of the roll that are within the head width of the roll ends. For instance, only one electrode passes over the edge of the roll end. Similarly, only two electrodes pass over an adjacent point inward from the edge of the roll end.

With the assumption that all else is equal, the material removal rate is determined by the amount of time a point on the roll surface is being machined. Thus, the central portion of the roll has a higher amount of material removed than the end portions of the roll. As a result, the roll profile deformation is different across the roll.

DISCLOSURE OF INVENTION

Accordingly, it is an object of the present invention is to provide a method and apparatus for electric-discharge texturing (EDT) ends of a roll such that the roll profile deformation is the same across the roll.

It is another object of the present invention to provide a method and apparatus for EDT ends of roll by using a head having a line of electrodes in which all of the electrodes pass over the central and end portions of the roll.

It is a further object of the present invention to provide a method and apparatus for EDT ends of a roll using a head having a line of electrodes in which the head traverses across the roll from one end to the other end and reverses direction at each roll end after all of the electrodes have lined up with the edge of the roll end.

It is still another object of the present invention to provide a method and apparatus for EDT ends of a roll using a head having a line of electrodes in which the head traverses past the ends of the roll such that the electrodes are taken off of the roll to enable all of the electrodes to pass over roll surface at the roll ends.

It is still a further object of the present invention to provide a method and apparatus for EDT ends of a roll using a head having a line of electrodes in which the head traverses past the ends of the roll such that all but one electrode in the line of electrodes are taken off of the roll.

In carrying out the above objects and other objects, the present invention provides a method for electric-discharge texturing the surface of a roll having first and second ends connected by a center portion. The method includes rotatably supporting a roll about a roll axis. The method further includes providing a head being movable in a direction parallel to the roll axis and providing a plurality of electrodes mounted on the head. Each of the plurality of electrodes is movable in a direction transverse to the roll axis to maintain a desired spacing with respect to the surface of the roll. Each of the plurality of electrodes is then positioned at a sparking position along the direction transverse to the roll axis to effect sparking with the surface of the roll. The head is then moved in a direction from the center portion of the roll towards the first end of the roll along the direction parallel to the roll axis such that each of the electrodes traverse across the surface of the first end of the roll. Each of the plurality of electrodes is then positioned at a retracted position along the direction transverse to the roll axis as each of the electrodes passes off the first end of the roll.

Further, in carrying out the above objects and other objects, the present invention provides an EDT apparatus in accordance with the above-described method.

The objects, features, and advantages of the present invention are readily apparent from the following detailed description of the best mode for carrying out the invention when taken in connection with the accompanying drawings.

BRIEF DESCRIPTION OF DRAWINGS

FIG. 5 is a graph illustrating the amount of material removal from the roll for the prior art method illustrated in FIG. 4;

BEST MODE FOR CARRYING OUT THE INVENTION

Figure 1:
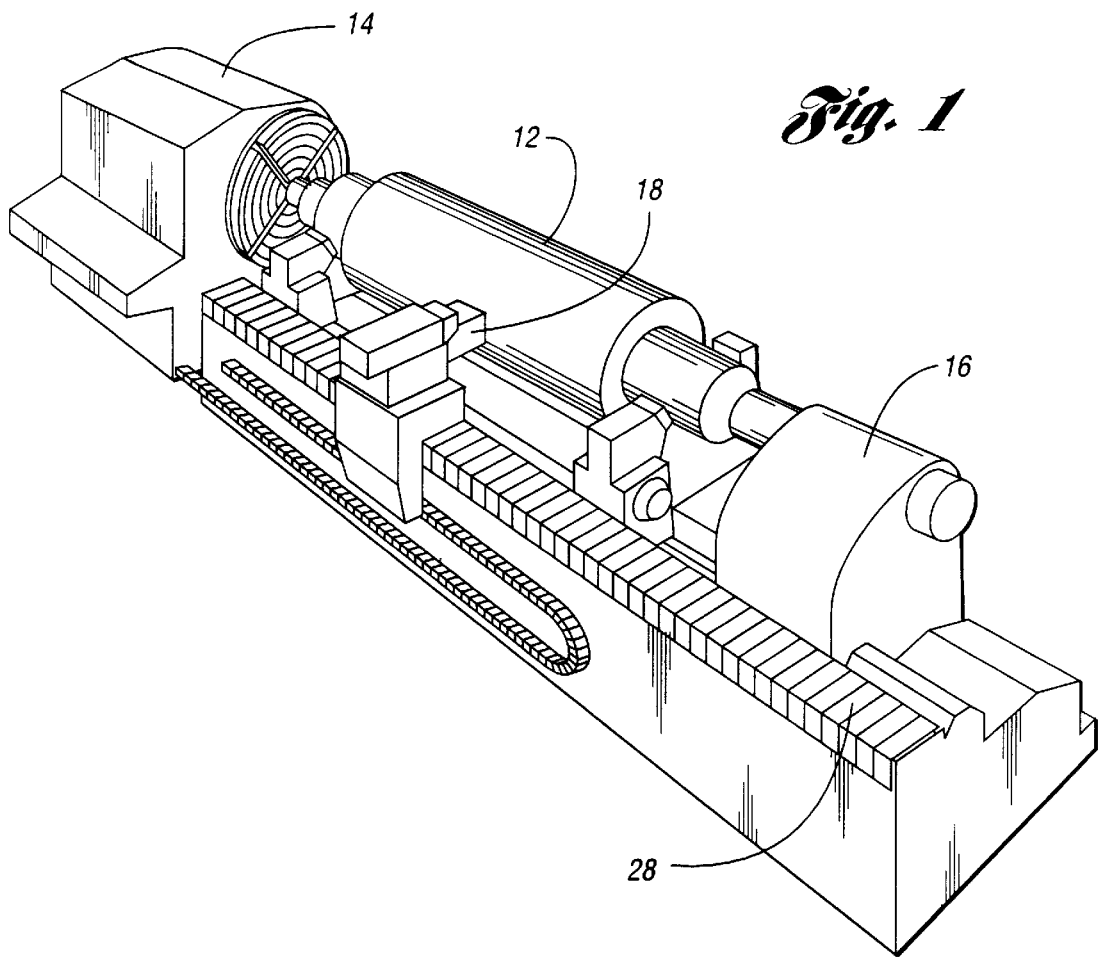
FIG. 1 is a perspective view of an electrical-discharge texturing (EDT) apparatus in accordance with the present invention mounted adjacently to the roll surface of a mill roll.
Figure 3:
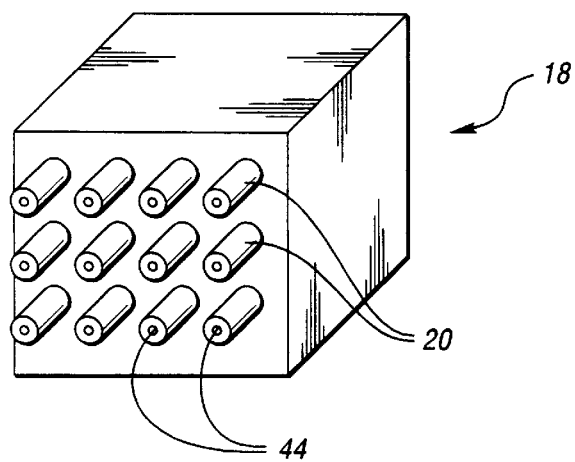
FIG. 3 is a side elevational perspective view of the head of the EDT apparatus.
Figure 2:
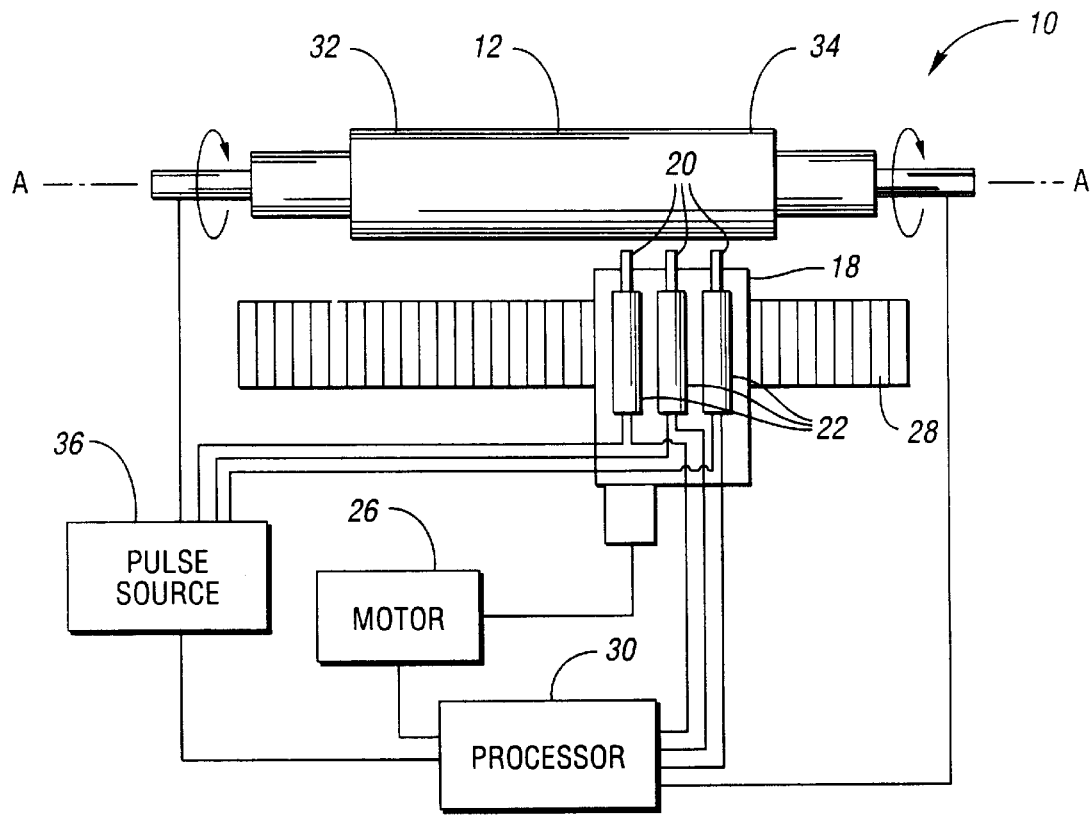
FIG. 2 is an overall block diagram of the EDT apparatus.

Referring now to FIGS. 1, 2, and 3, an electrical-discharge texturing (EDT) apparatus 10 in accordance with the present invention is shown. EDT apparatus 10 textures the roll surface of roll 12 which lies horizontally for rotation about its longitudinal axis between a head stock 14 driven by an electric motor (not shown) over a controlled range of speeds and an idler tail stock 16 of a lathe-type machine.

EDT apparatus 10 includes a head 18 having a plurality of electrodes 20. Each of electrodes 20 has an associated actuator 22. Actuators 22 are driven to move electrodes 20 towards and away from roll 12 in a direction perpendicular to the roll axis A. Actuators 22 move electrodes 20 to maintain a proper gap spacing between roll 12 and the electrodes during the texturing process. A motor 26 drives head 18 longitudinally of the roll 12, i.e., in a direction parallel to the roll axis A, on a track 28.

A processor 30 controls the rotation of roll 12 about the roll axis A. As roll 12 rotates, processor 30 controls motor 26 to move head 18 longitudinally of the roll such that electrodes 20 traverse the roll surface from one roll end 34 to the other roll end 32. A pulse source 36 is electrically individually connected between roll 12 and each of electrodes 20 to provide an electrical voltage pulse there between to generate a spark for performing the texturing operation. Processor 30 controls pulse source 36 to control the duration and on and off times of the electrical voltage pulses. Processor 30 further controls actuators 22 to move electrodes 20 towards and away from roll 12 to maintain the proper gap spacing to ensure that the sparks are generated between the electrodes and the roll. To maintain the proper spacing of electrodes 20 with respect to roll 12, processor 30 employs a servo control algorithm.

With specific reference now to FIG. 3, head 18 includes an array of electrodes 20. The array of electrodes 20 includes a plurality of electrode rows. Each electrode row consists of a line of electrodes positioned apart from one another along the line. Dielectric fluid is admitted to the interface between electrodes 20 and roll 12 via bores 44 extending through the electrodes. A dielectric filtration system (not shown) circulates the dielectric fluid back to bores 44 for readmission. The dielectric filtration system removes from the dielectric fluid the EDT chips and other by products of the fluid breakdown due to the spark heat.

Figure 4:
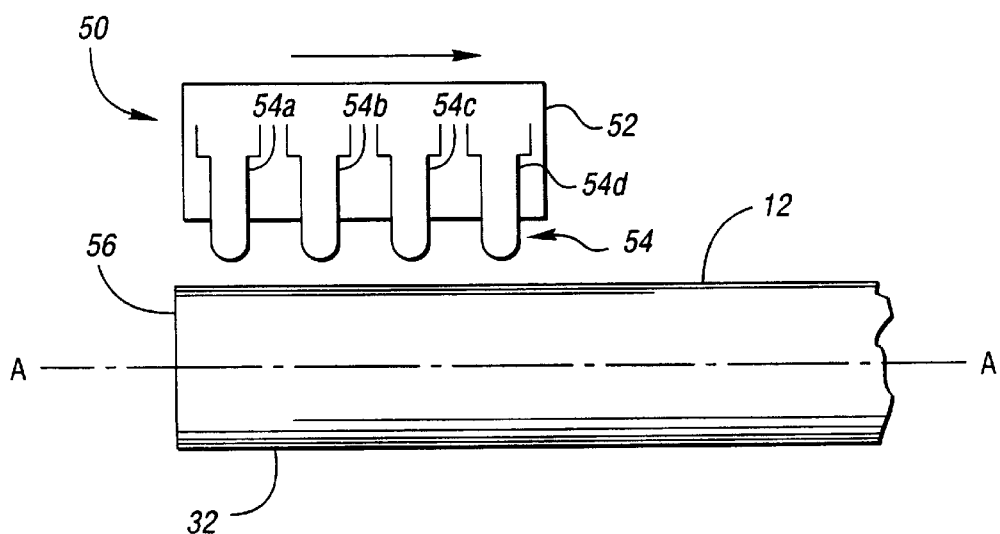
FIG. 4 illustrates a prior art method of using an EDT apparatus for texturing the ends of a roll.

Referring now to FIGS. 4 and 5, EDT texturing of roll ends in accordance with the prior art and the associated disadvantages thereof are shown. Prior art EDT apparatus 50 includes a head 52 having a plurality of electrodes 54. For purposes of this illustration, electrodes 54 consist of four electrodes each having a circular surface of one inch diameter arranged in a line parallel with the roll axis A. Electrodes 54 are spaced five inches apart from one another at their centers.

In operation, head 52 longitudinally moves electrodes 54 between roll ends 32 and 34 while reversing direction to go towards one roll end as soon as the other roll end has been reached. A disadvantage with prior art EDT apparatus 50 is that head 52 reverses direction when an electrode lines up with the roll end. For instance, as shown in FIG. 4, head 52 reverses direction once electrode 54a is lined up with edge 56 of roll end 32. As a result, only electrode 54a passes over the roll surface at edge 56. Similarly, only electrodes 54a and 54b pass over the roll surface adjacent edge 56. At a distance far enough away from edge 56, in this case, sixteen inches, all of electrodes 54 pass over the roll surface. The same problem then occurs again at the other roll end.

Thus, as shown in FIG. 5, the roll profile deformation at roll end 32 is different than the roll profile deformation of the roll portions farther from the roll end as shown by plot 58.

At a point more than sixteen inches away from edge 56, all four electrodes 54 completely pass over this point causing four units of material removal per traverse. At a point three inches away from edge 56, only electrode 54a passes over this point resulting in one unit of material removal per traverse. Similar arguments follow for points chosen to match two and three electrode pitches in from edge 56. The other roll end has a mirror image profile and the center portion between the roll ends has a consistent relative material removal rate of four units.

Electrodes 54 have a finite width and the same arguments as above when applied to the surfaces of the electrodes account for the slopes of plot 58 observed at zero, five, ten, and fifteen inches from edge 56. The maximum difference in profile is equal to the material removed from the center roll 12 for coverage. The span over which the profile is deformed is a function of head width.

Referring now to FIGS. 6A through 6G, with continual reference to FIG. 3, EDT texturing of roll ends in accordance with the present invention is shown. For purposes of this illustration, head 18 includes four electrodes 20 having the same characteristics as electrodes 54 of prior art EDT apparatus 50.

In operation, head 18 longitudinally moves electrodes 20 to a position where electrode 20a is lined up with edge 56 of roll end 32 as shown in FIG. 6A. At this point, unlike prior art EDT apparatus 50, head 18 continues moving in the same direction toward edge 56 such that electrode 20a moves past the edge and electrode 20b lines up with the edge as shown in FIG. 6B. As electrode 20a moves past edge 56 and passes off roll end 32, processor 30 controls actuator 22 associated with electrode 20a to retract electrode 20a to a retracted position. The retracted position is a preset distance away from the roll surface. The distance may be preset by means of timing or CNC measuring devices (not specifically shown). Processor 30 also controls pulse source 36 to shut off the electrical power provided to electrode 20a and shuts off the dielectric fluid provided to electrode 20a. EDT apparatus 10 identifies edge 56 of roll end 32 through the use of electrical switches or the CNC distance measuring devices (not specifically shown).

Figure 6C:
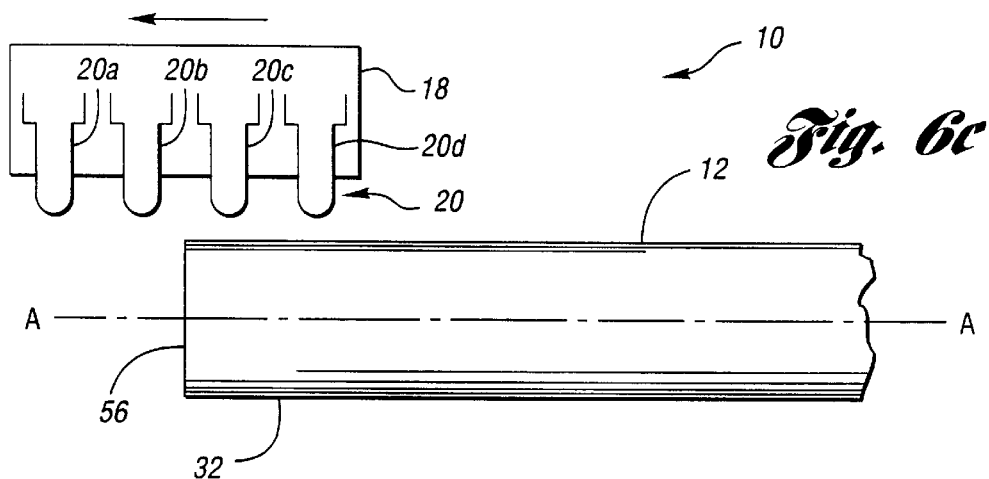
FIGS. 6(A–G) illustrates a method of using an EDT apparatus for texturing the ends of a roll in accordance with the present invention.
Figure 6D:
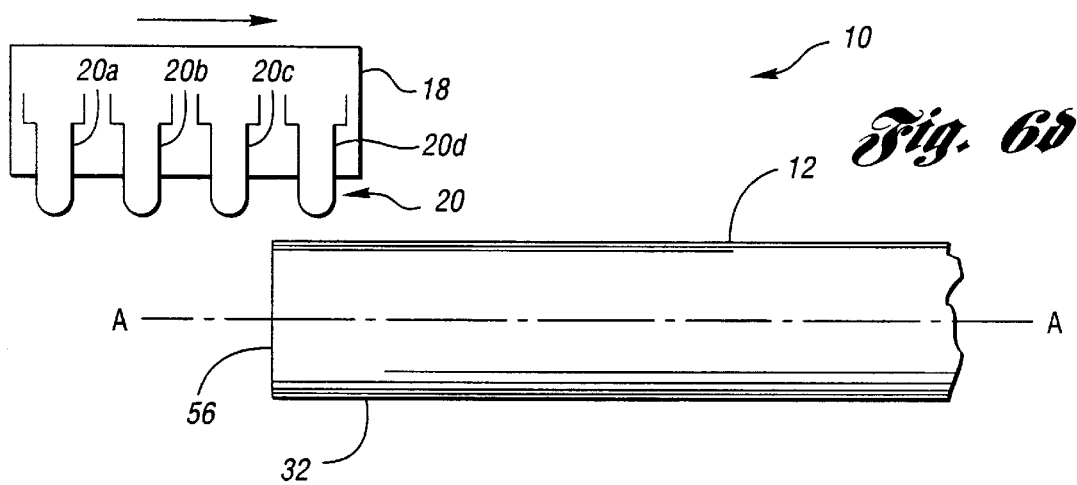

Head 18 then continues moving in the same direction toward edge 56 such that electrode 20b moves past the edge and electrode 20c lines up with the edge as shown in FIG. 6C. Processor 30 similarly retracts electrode 20b and shuts off the electrical power and dielectric fluid provided thereto. Head 18 then continues moving in the same direction until electrode 20d lines up with edge 56 as shown in FIG. 6D. Likewise, processor 30 retracts electrode 20c and shuts off the electrical power and dielectric fluid provided thereto.

Figure 6E:
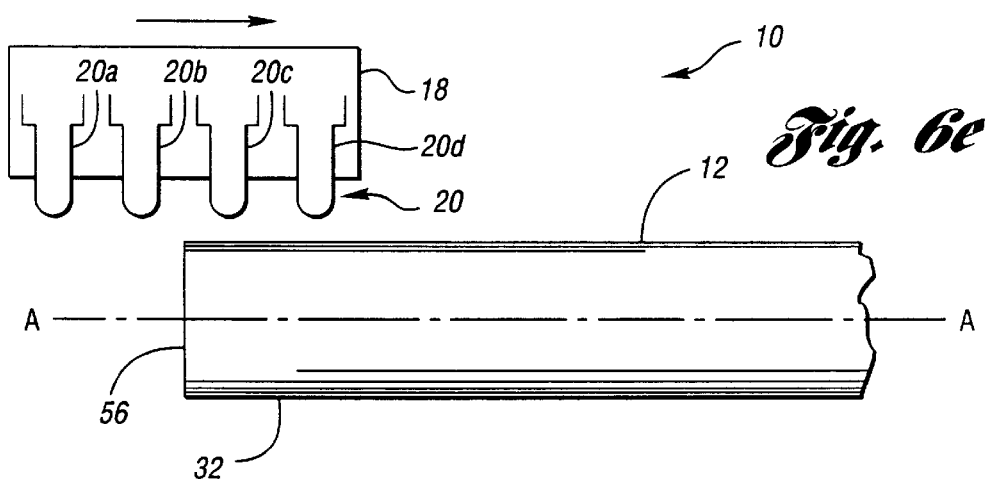
Figure 6F:
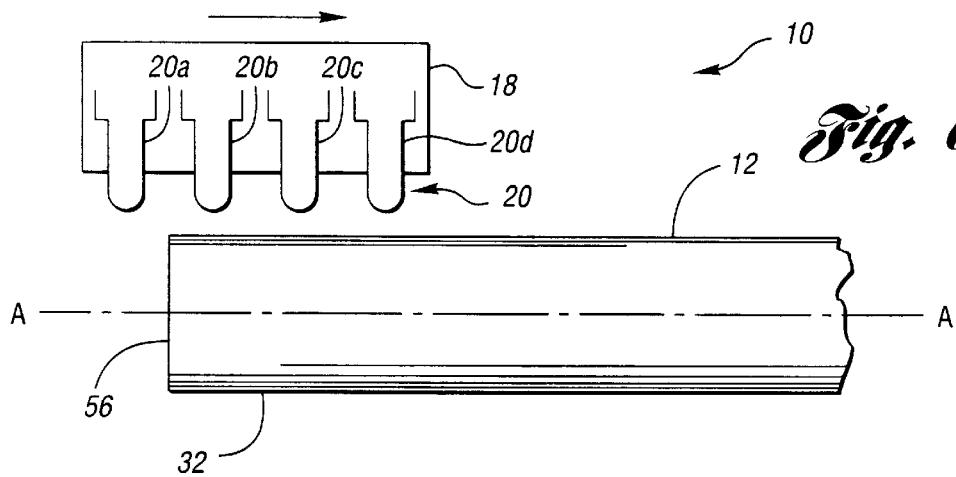
Figure 6G:
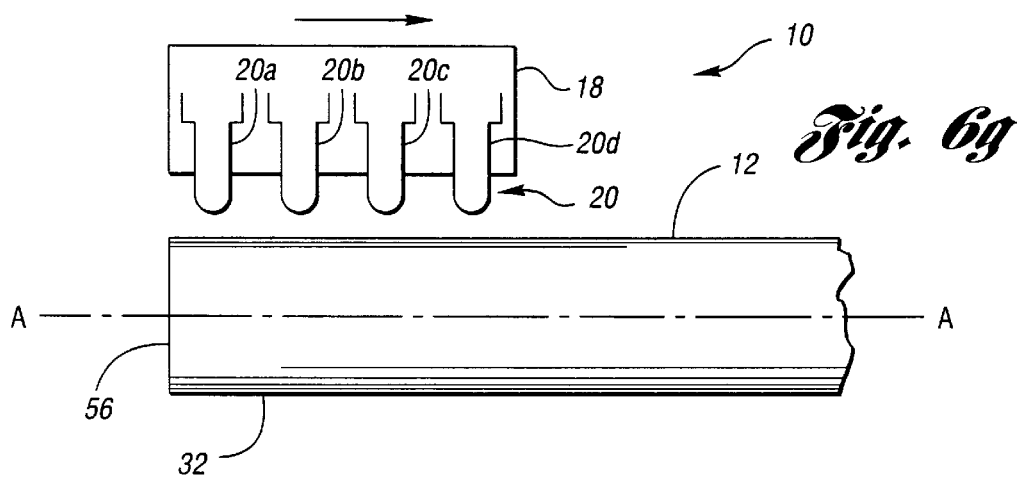

At this point, head 18 reverses direction and moves toward the other roll end until electrode 20c lines up with edge 56 as shown in FIG. 6E. As electrode 20c moves toward edge 56, processor controls actuator 22 associated with electrode 20c to move electrode 20c from the retracted position to an extended position back towards roll surface. Electrode 20c was moved to the retracted position so that roll interference would not be encountered as head 18 reversed traverse direction. Processor 30 also controls pulse source 36 to enable the electrical power provided to electrode 20c and turns on the dielectric fluid provided to electrode 20c. Head 18 continues on moving towards roll end 34 and the same process continues with respect to electrodes 20b and 20a as shown in FIGS. 6F and 6G, respectively.

At roll end 34, the end texturing process repeats with electrode 20d being taken off the edge of that roll end and then electrodes 20*c* and 20*b*. Head 18 then reverses back towards roll end 32 once electrode 20*a* lines up with the edge of roll end 34.

Figure 7:
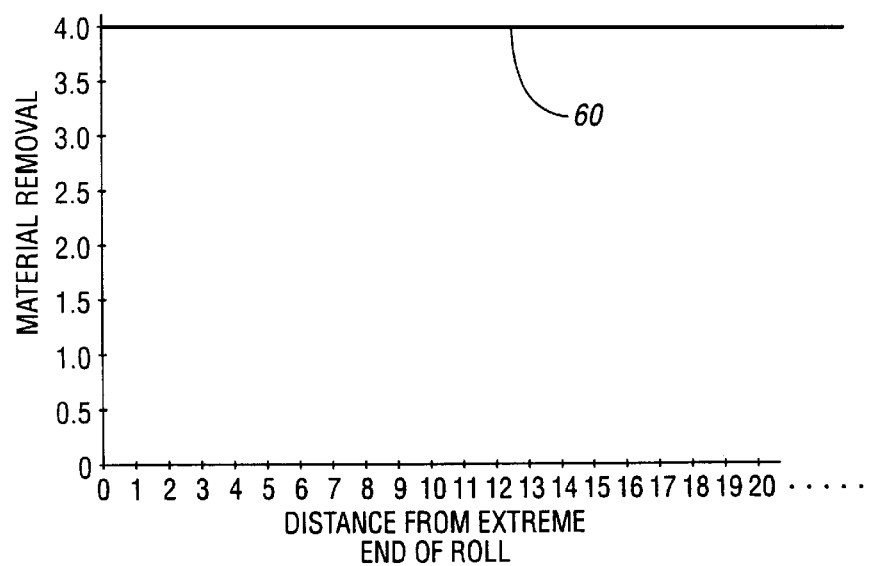
FIG. 7 is a graph illustrating the amount of material removal from the roll for the method in accordance with the present invention.

As shown with respect to FIGS. 6A through 6G, all of electrodes 20 pass over the roll surface at edge 56. Thus, as shown in FIG. 7, the roll profile deformation at roll end 32 is the same as the roll profile deformation in the center of roll 12 as shown by plot 60. At any point along roll 12, all four electrodes 20 completely pass over the point causing a consistent four units of material removal per traverse.

Thus it is apparent that there has been provided, in accordance with the present invention, a method and apparatus for EDT ends of a roll that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for electric-discharge texturing the surface of a roll having first and second ends connected by a center portion, the method comprising:

rotatably supporting a roll about a roll axis;

providing a head movable in a direction parallel to the roll axis;

providing a plurality of electrodes mounted on the head, each of the plurality of electrodes movable in a direction transverse to the roll axis to maintain a desired spacing with respect to the surface of the roll;

positioning each of the electrodes at a sparking position along the direction transverse to the roll axis to effect sparking with the surface of the roll;

moving the head back and forth across the roll surface between the first and second roll ends along the direction parallel to the roll axis such that each of the electrodes traverse across the entire surface of the roll, wherein moving the head back and forth across the roll surface between the first and second roll ends includes moving the head past the first and second roll ends such that the electrodes pass off the first and second roll ends causing the roll profile deformation to be consistent across the entire roll surface as each electrode effects the same amount of sparking at each point across the roll surface; and positioning each of the electrodes at a retracted position along the direction transverse to the roll axis as each of the electrodes passes off the first and second ends of the roll.

2. The method of claim 1 wherein:

moving the head back and forth across the roll surface between the first and second roll ends includes moving the head back and forth until only one electrode lines up with respective first and second roll ends.

3. The method of claim 1 further comprising:

positioning each of the electrodes at the sparking position along the direction transverse to the roll axis to effect sparking with the surface of the roll as each of the electrodes passes back over the first and second roll ends.

4. A roll textured in accordance with the method of claim 1.

* * * * *